(12) United States Patent
Keysers et al.

(10) Patent No.: US 8,194,926 B1
(45) Date of Patent: Jun. 5, 2012

(54) MOTION ESTIMATION FOR MOBILE DEVICE USER INTERACTION

(75) Inventors: Daniel M. Keysers, Zurich (CH); Thomas Deselaers, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/253,743

(22) Filed: Oct. 5, 2011

(51) Int. Cl.
 *G06K 9/00* (2006.01)
(52) U.S. Cl. ....................................... 382/103
(58) Field of Classification Search .................. 382/103, 382/202–203, 181–189; 341/20–22; 73/514.02, 73/510; 345/156–178, 667, 684; 340/407.1, 340/407.2
 See application file for complete search history.

(56) References Cited

U.S. PATENT DOCUMENTS

| | | | | |
|---|---|---|---|---|
| 6,861,946 | B2 * | 3/2005 | Verplaetse et al. | 340/407.2 |
| 7,884,807 | B2 * | 2/2011 | Hovden et al. | 345/173 |
| 2009/0184849 | A1 | 7/2009 | Nasiri et al. | |
| 2011/0163955 | A1 | 7/2011 | Nasiri et al. | |
| 2011/0197677 | A1 | 8/2011 | Nasiri et al. | |
| 2011/0316888 | A1 * | 12/2011 | Sachs et al. | 345/667 |

OTHER PUBLICATIONS

Vargha, et al. "MotionProcessing Technology Driving New Innovations in Consumer Products", InvenSense, Inc., Apr. 16, 2010 (8 pgs.).
Nasiri, et al, "Selecton and integration of MEMS-based motion processing in consumer apps", InvenSense, Inc., Jul. 8, 2009 (7 pgs.).
"Wii MotionPlus," Wikipedia [online]. First accessed on Aug. 23, 2011. Retrieved from the Internet: <http://en.wikipedia.org/wiki/Wii_MotionPlus> (6 pgs.).
"Wii Remote," Wikipedia [online]. First accessed on Aug. 23, 2011. Retrieved from the Internet: <http://en.wikipedia.org/wiki/Wii_Remote> (20 pgs.).

* cited by examiner

*Primary Examiner* — Ishrat I Sherali
(74) *Attorney, Agent, or Firm* — Shumaker & Sieffert, P.A.

(57) ABSTRACT

One or more sensors of a mobile computing device may detect a current movement characteristic of the mobile computing device and a current orientation characteristic of the mobile computing device, the current movement characteristic and the current orientation characteristic being based at least in part on a path of motion of the mobile computing device. An estimated path of motion may be defined based on the current movement characteristic and the current orientation characteristic. One or more characters based at least in part on the estimated path of motion may be identified. A graphical representation of the one or more characters may be inserted into a text input field, the graphical representation of the one or more characters and the text input field being outputted at a display of the mobile computing device.

20 Claims, 6 Drawing Sheets

MOTION ESTIMATION FOR MOBILE DEVICE USER INTERACTION

BACKGROUND

Mobile computing devices such as smartphones, personal digital assistants, portable media players, and tablets have grown in popularity in recent years. While some mobile computing devices include a physical keyboard and/or other physical means of user interaction with mobile computing devices, more and more mobile computing devices have eschewed physical keyboards in favor of a touchscreen-based user interface. Users often interact with such a touchscreen-based interface by using their fingers to contact the touchscreen in order to type on a virtual keyboard presented on the touchscreen or to otherwise interact with the touchscreen-based interface.

SUMMARY

In general, this disclosure describes techniques for user interaction with a mobile computing device based on the physical motion of the device as measured by one or more sensors of the device.

In one example, the disclosure is directed toward a method. The method may include detecting, by one or more sensors of a mobile computing device, a current movement characteristic of the mobile computing device and a current orientation characteristic of the mobile computing device, the current movement characteristic and the current orientation characteristic being based at least in part on a path of motion of the mobile computing device. The method may further include defining, based on the current movement characteristic and the current orientation characteristic, an estimated path of motion of the mobile computing device. The method may further include identifying one or more characters based at least in part on the estimated path of motion. The method may further include inserting a graphical representation of the one or more characters into a text input field, the graphical representation of the one or more characters and the text input field being outputted at a display of the mobile computing device.

In another example, the disclosure is directed to a mobile computing device. The mobile computing device may include one or more processors. The mobile computing device may further include a portion estimation module being executed on the one or more processors and configured to estimate which portion of a physical enclosure of the mobile computing device is in contact with a two-dimensional surface. The mobile computing device may further include one or more sensors configured to define one or more measurements of one or more forces acting upon the mobile computing device in response to movement of the mobile computing device along a path of motion. The mobile computing device may further include a path estimation module being executed on the one or more processors and configured to define an estimated path of motion for the portion of the physical enclosure of the mobile computing device based on the one or more measurements.

In another example, the disclosure may be directed towards a non-transitory processor-readable medium comprising code representing instructions. The instructions may, when executed by the processor, cause the processor to detect, by one or more sensors of a mobile computing device, one or more changes in at least one of movement and orientation of the mobile computing device, the one or more changes being based at least in part on movement of the mobile computing device in three-dimensional space. The instructions may, when executed by the processor, further cause the processor to define an estimated path of motion based on the one or more changes, the estimated path of motion including an indication of a break between a first series of strokes and a second series of strokes. The instructions may, when executed by the processor, further cause the processor to define one or more characters based at least in part on the estimated path of motion.

The details of one or more examples of the disclosure may be set forth in the accompanying drawings and the description below. Other features, objects, and advantages of the disclosure may be apparent from the description and drawings, and from the claims.

DETAILED DESCRIPTION

The ease with which a user is able to input data into a touchscreen-based mobile computing device may correlate with the physical size of the mobile computing device's touchscreen. Because of this general correlation, users may find it easier to interact with mobile devices having relatively larger touchscreens (such as tablets), as compared to devices having relatively smaller touchscreens (such as smartphones and portable media players). For example, in the context of text entry, mobile computing devices may generally display a virtual keyboard on the touchscreen for use as the primary form of text input. While tablets or other devices with relatively larger touchscreens can take advantage of a touchscreen's size to present a virtual keyboard having a relatively larger target size for its keys, smartphones or other devices with relatively smaller touchscreens may be constrained by the size of their touchscreens into presenting a virtual keyboard having a relatively small (and thus hard-to-hit) target size for its keys. This problem is also true for mobile computing devices having physical keyboards, as the keys are generally small in size and may be difficult for a user to accurately select due to the limitations in the total physical size of such mobile computing devices themselves.

Therefore, one or more aspects of the present disclosure may include techniques for users of a mobile computing device to more easily interact with and provide input into a mobile computing device regardless of the device's physical dimensions or those of the device's touchscreen. Such techniques may include tracking the physical movements of the mobile computing device using sensors included in the mobile computing device and converting movement data captured by the sensors into textual input information.

Figure 1:
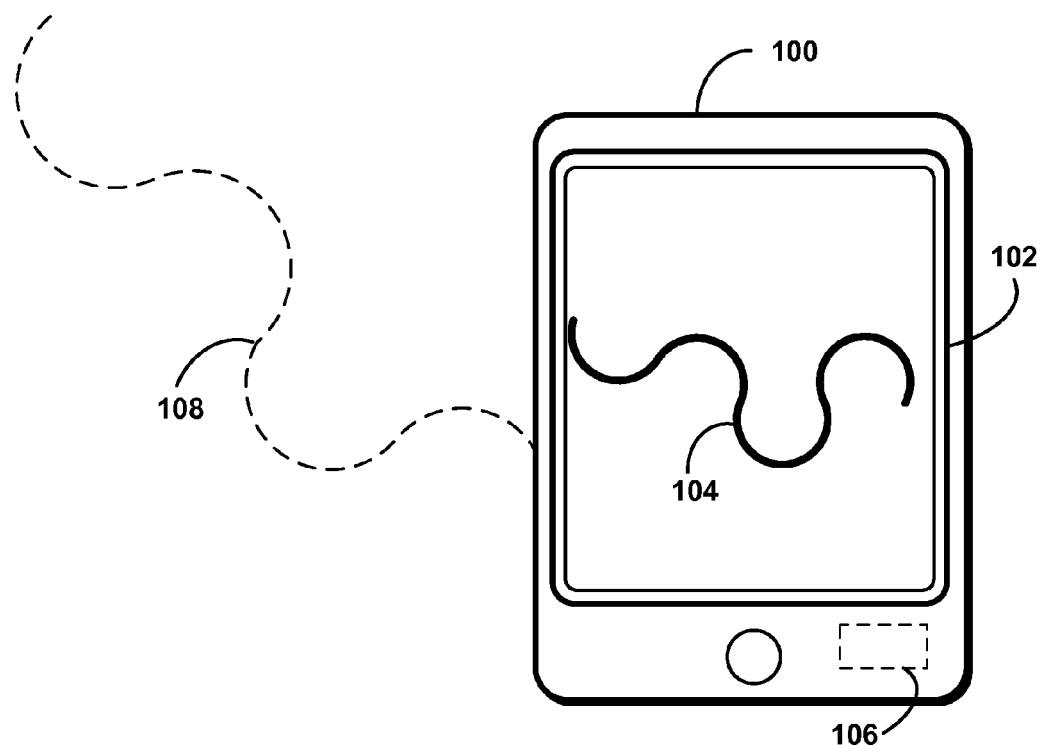
FIG. 1 is a conceptual diagram illustrating an example of a mobile computing device moving about a path in space.

FIG. 1 is a conceptual diagram illustrating an example mobile computing device moving about a path in space. As shown in FIG. 1, a mobile computing device 100 may include a display 102 and sensors 106. In some examples, the mobile computing device 100 may be any portable electronic device, including but not limited to a mobile phone, a personal digital assistant, a portable media player, a handheld gaming console, a handheld computer, a tablet computer, or the like, including a combination of two or more of these items. In some examples, the display 102 may be any output device capable of presenting visual information to a user of the mobile computing device 100, including but not limited to a touch-sensitive display, a pressure-sensitive display, a liquid crystal display (LCD), a light-emitting diode (LED) display, a cathode ray tube (CRT) display, a plasma display, or the like, including a combination of two or more of these items.

In some examples, the sensors 106 may be one or more devices capable of detecting a current movement characteristic of the mobile computing device 100 and a current orientation characteristic of the mobile computing device 100. The current movement characteristic of the mobile computing device 100 and the current orientation characteristic of the mobile computing device 100 may be based at least in part on a path of motion of the mobile computing device 100. In some examples, the current movement characteristic may include current acceleration characteristics and/or current rotational characteristics. For example, the current acceleration characteristics may include acceleration forces applied to the mobile computing device 100 in three dimensions, the current rotational characteristics may include angular speed of the computing device in three dimensions, and the current orientation characteristic may include data regarding the azimuth, pitch, and roll of the mobile computing device 100. In some examples, the sensors 106 may be able to measure physical quantities, such as the ambient magnetic field in three dimensions around the mobile computing device 100, audio waveforms, image data, and proximity of objects to the mobile computing device 100, etc. In some examples, sensors 106 may include but is not limited to an accelerometer, a gyroscope, an orientation sensor, a linear acceleration sensor, a gravity sensor, a rotation vector sensor, a microphone, a camera, or the like, including a combination of two or more of these items.

The mobile computing device 100 may physically move in one, two, or three-dimensional space to form a path of motion 108, such as the path traveled by the mobile computing device 100. In some examples, the path of motion 108 may be made up of a plurality of strokes. In some examples, a stroke may be a linear movement of the mobile computing device 100, or may be a movement in one direction by the mobile computing device 100. In some example, a stroke may be any portion of the path of motion 108. One or more of the sensors 106 may repeatedly detect physical characteristics, such as a current movement characteristic and an orientation characteristic of the mobile computing device 100 and/or physical characteristics of the surrounding environment as the mobile computing device 100 is in motion.

In one example, one or more of the sensors 106 may repeatedly perform hundreds or thousands of detections and/or measurements every second, and may generate one or more signals corresponding to the detected characteristics, such as the detected current movement characteristic and current orientation characteristic of the mobile computing device 100. In some examples, the one or more signals may be data regarding the current movement characteristic and the current orientation characteristic of the mobile computing device 100. In some examples, the data may include numeric values of acceleration forces in three dimensions, or numeric values of angular speed in three dimensions. Based on the characteristics detected by one or more of the sensors 106 as the mobile computing device 100 moves along the path of motion 108, the sensors 106 may capture the relative movements of the mobile computing device 100, the mobile computing device 100 may define an estimated path of motion 104, and the display 102 of the mobile computing device 100 may output the estimated path of motion 104.

In one example, some of the processing for generating the estimated path of motion 104 may be offloaded from the mobile computing device 100 to an external system. The characteristics detected by one or more of the sensors 106 may be communicated by the mobile computing device 100 to the external system, and the external system may define the estimated path of motion 104 and communicate the estimated path of motion 104 back to the mobile computing device 100.

In one example, estimated path of motion 104 may have a direct one-to-one correspondence with the path of motion 108 of the mobile computing device 100. The estimated path of motion 104 may also be scaled up or down in comparison to the path of motion 108. If the path of motion 108 of the mobile computing device 100 is in three dimensions, a projection to two dimensions may be performed so that the estimated path of motion 104 may be displayed on a two-dimensional display as a two-dimensional representation of the three dimensional path of motion 108.

Figure 2:
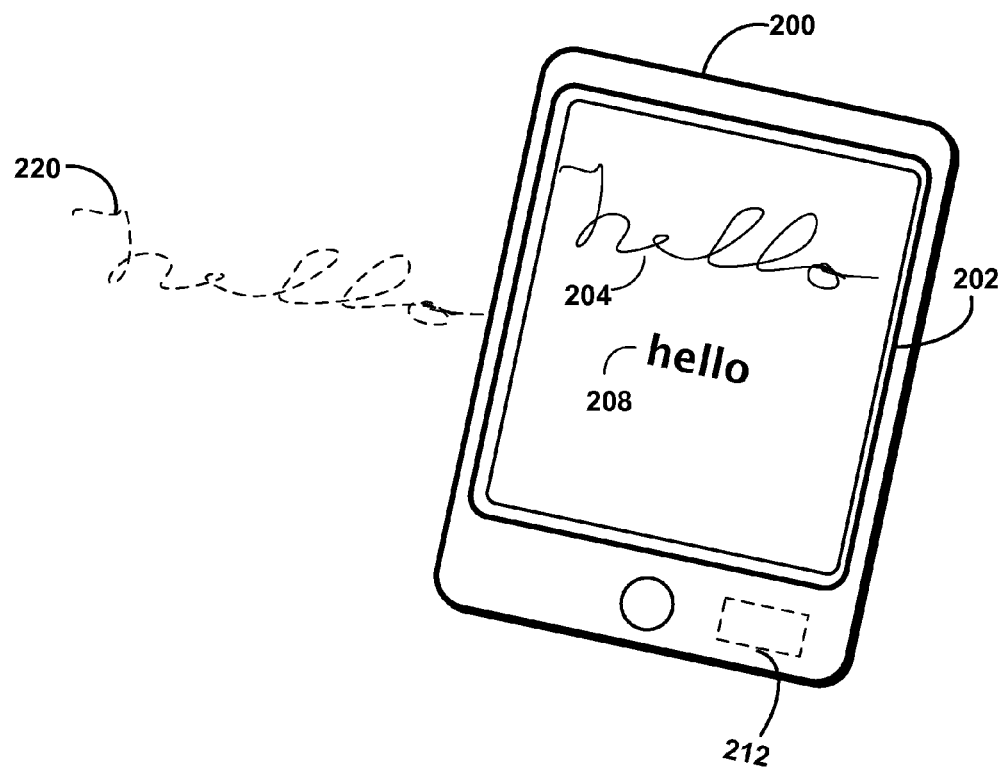
FIG. 2 is a conceptual diagram illustrating an example mobile computing device moving about a path in space to form one or more textual characters.

FIG. 2 is a conceptual diagram illustrating an example mobile computing device moving about a path in space to form one or more textual characters. As shown in FIG. 2, a mobile computing device 200 may include display 202 and sensors 212. In some examples, the mobile computing device 200 may be any portable electronic device, including but not limited to a mobile phone, a personal digital assistant, a portable media player, a handheld gaming console, a handheld computer, a tablet computer, or the like, including a combination of two or more of these items. In some examples, the display 202 may be any output device capable of presenting visual information to a user of the mobile computing device 200, including but not limited to a touch-sensitive display, a pressure-sensitive display, a liquid crystal display (LCD), a light-emitting diode (LED) display, a cathode ray tube (CRT) display, a plasma display, or the like, including a combination of two or more of these items.

In some examples, the sensors 212 may be any device capable of detecting changes in physical characteristics, such as one or more changes in at least one of movement and orientation of the mobile computing device 200. In some examples, changes in movement may include changes in acceleration and/or changes in rotation. In some examples, changes in movement may include changes in the acceleration of mobile computing device 200, or may include changes in the angular speed of the mobile computing device 200. In some examples, changes in orientation of the mobile computing device 200 may include changes in azimuth, pitch, and roll values of the mobile computing device 200. The sensors 212 may include but is not limited to an accelerometer, a gyroscope, an orientation sensor, a linear acceleration sensor, a gravity sensor, a rotation vector sensor, a microphone, a camera, or the like, including a combination of two or more of these items.

The mobile computing device 200 may physically move in one, two, or three-dimensional space to form a path of motion 220. One or more of the sensors 212 may repeatedly detect changes in physical characteristics of the mobile computing device 200, such as one or more changes in at least one of movement and orientation of the mobile computing device 200, and/or changes in the physical characteristics of the surrounding environment based at least in part on the movement of the mobile computing device 200 in three-dimensional space along a path of motion 220.

The path of motion 220 traveled by the mobile computing device 200 may appear to form one or more characters, such as alphanumeric characters. Based on the one or more changes in at least one of movement and orientation of the mobile computing device 200 detected by the one or more of the sensors 212 as the mobile computing device 200 is in motion along the path of motion 220, the mobile computing device 200 may define an estimated path of motion 204 corresponding to movements of the mobile computing device 200, and the estimated path of motion 204 may be outputted to the display 202 of the mobile computing device 200. In addition, the mobile computing device 200 may define one or more characters 208 (e.g., the word "hello" shown in FIG. 2) based at least in part on the estimated path of motion 204, and may also output the one or more characters 208 to the display 202 of the mobile computing device 200.

In one example, some of the processing for defining the estimated path of motion 220 and/or for identifying one or more characters 208 based at least in part on the estimated path of motion 204 may be offloaded from the mobile computing device 200 to an external computing device (e.g., the cloud). The changes in physical characteristics of the mobile computing device 200, such as at one or more changes in at least one of movement and orientation of the mobile computing device 200 detected by one or more of the sensors 212, may be communicated by the mobile computing device 200 to the external system. The external system may define the estimated path of motion 204 based on the detected changes and may identify one or more characters 208 based at least in part on the estimated path of motion 204. The external computing device may communicate the one or more characters 208 back to the mobile computing device 200. Alternatively, the mobile computing device 200 may define the estimated path of motion 204 and may communicate the estimated path of motion 204 to the external system to be defined as one or more characters 208.

Figure 3:
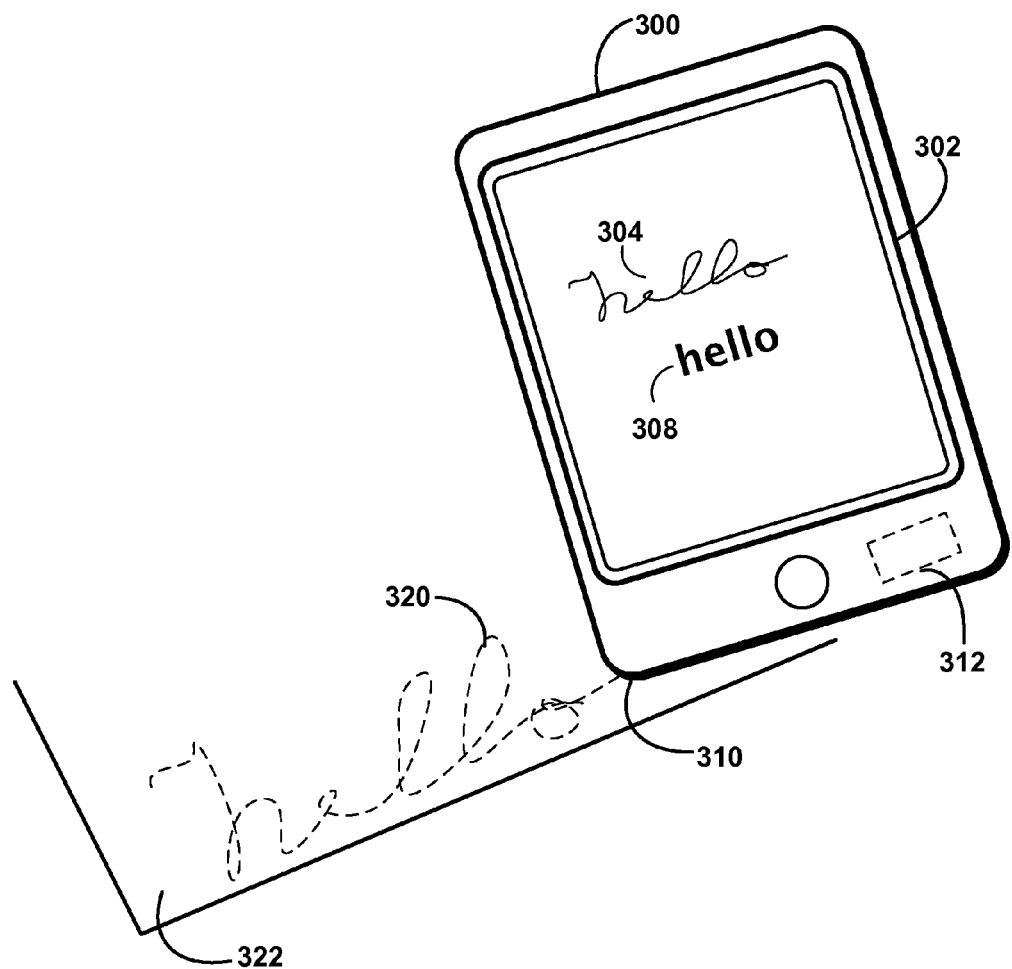
FIG. 3 is a conceptual diagram illustrating an example mobile computing device moving against a two-dimensional surface to form one or more textual characters.

FIG. 3 is a conceptual diagram illustrating an example mobile computing device moving against a two-dimensional surface to form one or more textual characters. As shown in FIG. 3, a mobile computing device 300 may include display 302 and sensors 312. In some examples, the mobile computing device 300 may be any portable electronic device, including but not limited to a mobile phone, a personal digital assistant, a portable media player, a handheld gaming console, a handheld computer, a tablet computer, or the like, including a combination of two or more of these items. In some examples, the display 302 may be any output device capable of presenting visual information to a user of the mobile computing device 300, including but not limited to a touch-sensitive display, a pressure-sensitive display, a liquid crystal display (LCD), a light-emitting diode (LED) display, a cathode ray tube (CRT) display, a plasma display, or the like, including a combination of two or more of these items.

In some examples, the sensors 312 may be any device capable of defining one or more measurements of one or more forces acting upon the mobile computing device 300 in response to movement of the mobile computing device along a path of motion 320. For example sensors 312 may be able to define one or more measurements of acceleration forces acting upon the mobile computing device 300, or angular forces being applied to the mobile computing device 300. Sensors 312 including but not limited to an accelerometer, a gyroscope, an orientation sensor, a linear acceleration sensor, a gravity sensor, a rotation vector sensor, a microphone, a camera, or the like, including a combination of two or more of these items.

A portion of the physical body of the mobile computing device 300, such as an edge, a surface, or a corner 310 of the physical enclosure of the mobile computing device 300, may be used much like a pen point by the user to contact and "write" on a two-dimensional surface 322, such as a piece of paper on a desk, or a whiteboard, by moving the mobile computing device 300 in a two-dimensional path of motion 320 against the surface 322.

The sensors 312 may be able to define one or more measurements of one or more forces acting upon mobile computing device 300 as the mobile computing device 300 moves in the two-dimensional path of motion 320 against surface 322. The measurements defined by the sensors 312 of the mobile computing device 300 based in part on the path of motion 320 may be used to estimate which portions, such as the edge, or the corner 310, of the physical enclosure of the mobile computing device 300 is contacting the surface 322, as well as to define an estimated path of motion for the portion, such as the corner 310, of the physical enclosure of the mobile computing device 300 based on the one or more measurements.

Alternatively, the portion, such as the edge or the corner 310 of the physical enclosure of the mobile computing device 300 may be pre-determined or otherwise fixed. The mobile computing device 300 may output an estimated path of motion 304 of the portion of the physical enclosure of the mobile computing device 300, such as the corner 310 of the physical enclosure of the mobile computing device 300, to the display 302 of the mobile computing device 300. The mobile computing device 300 may also define one or more characters 308 (e.g., the word "hello" shown in FIG. 3) based at least in part on the path of motion 320, and may output the one or more characters 308 to the display 302 of the computing device 300.

Figure 4:
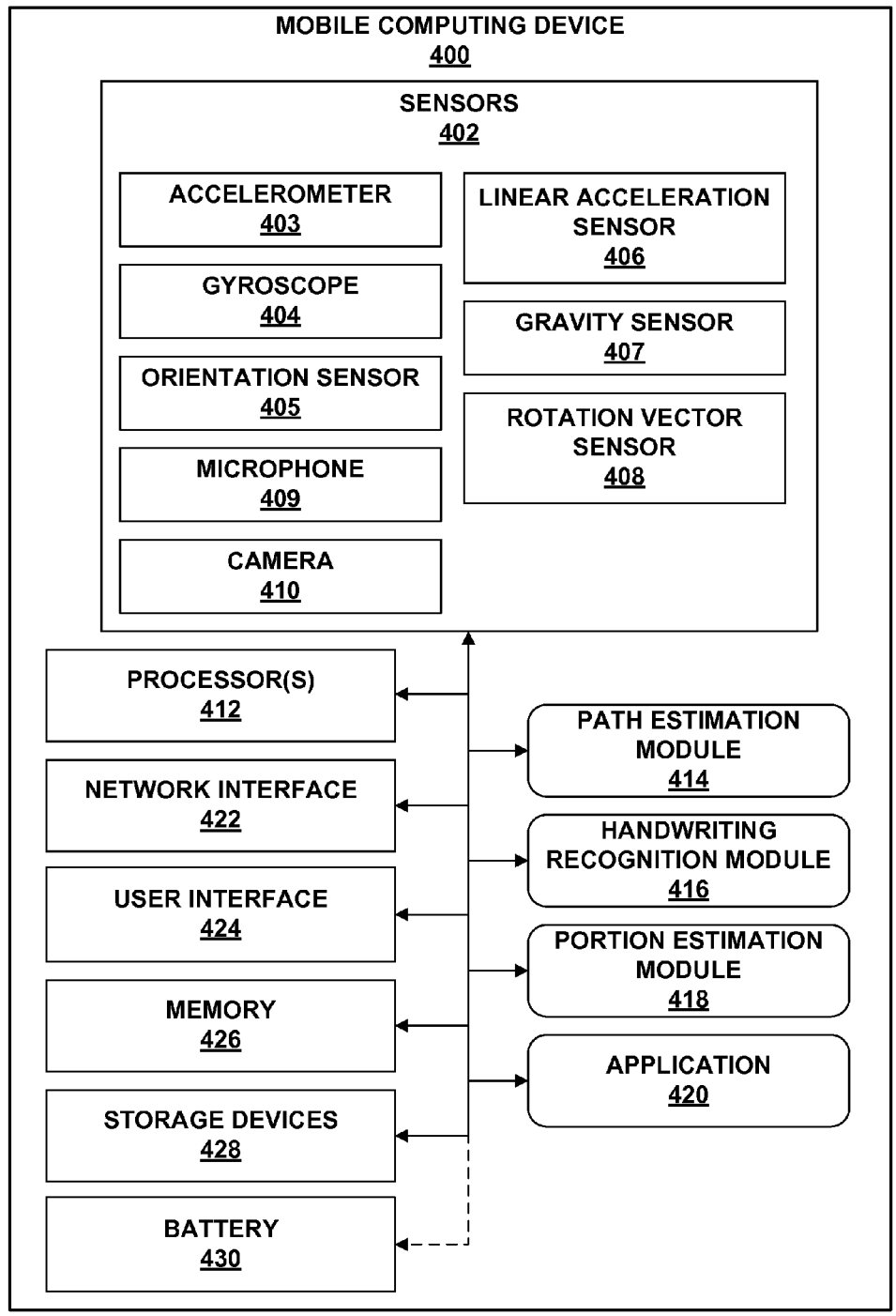
FIG. 4 is a block diagram illustrating details of one example of the mobile computing device shown in FIGS. 1-3.

FIG. 4 is a block diagram illustrating an example of a mobile computing device 400 whose path of motion may be estimated. As shown in FIG. 4, the mobile computing device 400 may include sensors 402, processor(s) 412, network interface 422, user interface 424, memory 426, storage devices 428, and optionally battery 430. Each of components 402, 412, 422, 424, 426, 428, and 430 may be interconnected via one or more busses for inter-component communications.

Sensors 402 may measure, detect, or capture one or more current physical characteristics, forces acting upon the mobile computing device 400, and/or changes in movement and rotation, and may generate one or more signals corresponding to the measured or captured physical quantities. Sensors 402 may, for example, include but is not limited to one or more of: accelerometer 403, gyroscope 404, orientation sensor 405, linear acceleration sensor 406, gravity sensor 407, rotation vector sensor 408, microphone 409, and camera 410. Sensors 402 may also include one or more additional sensors not listed above.

Accelerometer 403 can measure and/or detect the acceleration and/or changes in acceleration of the mobile computing device 400 in three dimensions as the mobile computing device 400 is in motion. In some examples, accelerometer 403 may generate numeric data in meters per second squared (m/s^2) to represent the measured acceleration forces in the x, y, and z axis.

Gyroscope 404 can measure and/or detect the rate of rotation and/or changes in the rate of rotation of the mobile computing device 400 in three dimensions. In some examples, gyroscope 404 may generate numeric data in radians per second to represent the measured angular speed around the x, y, and z axis.

Orientation sensor 405 can measure and/or detect the angles in rotation of the mobile computing device 400 in three dimensions. In some examples, orientation sensor 405 may generate numeric data to represent the azimuth, pitch, and roll of the mobile computing device 400.

Linear acceleration sensor 406 can measure acceleration of the mobile computing device 400 in three dimensions not including gravity. Gravity sensor 407 can indicate the direction and magnitude of gravity. When the mobile computing device 400 is at rest, the output from the gravity sensor 407 may be equal to that of the accelerometer 403. Rotation vector sensor 408 can measure the orientation of the mobile computing device 400 and may represent the orientation as a combination of an angle and an axis. Microphone 409 can capture sound around the mobile computing device 400. Camera 410 can capture image data.

One or more processor(s) 412 may be configured to implement functionality and/or process instructions for execution within the mobile computing device 400. Processor(s) 412 may be capable of processing instructions stored in memory 426 or storage devices 428.

In some examples, path estimation module 414, handwriting recognition module 416, portion estimation module 418, and application 410 may all be stored in memory 426 or storage devices 428, and may all be executed by processor(s) 412. In general, path estimation module 414, handwriting recognition module 416, and portion estimation module 418 may be implemented in software, hardware, and/or firmware.

In some examples, one or more of path estimation module 414, handwriting recognition module 416, portion estimation module 418, and application 410 may be stored in memory on an external system (e.g., the cloud) and may be executed by one or more processor(s) of the external system. One or more of path estimation module 414, handwriting recognition module 416, portion estimation module 418, and application 410 on the external system may communicate with the mobile computing device 400 via network interface 422.

Path estimation module 414 may receive one or more signals generated by sensors 402 corresponding to at least one of movement characteristics and orientation characteristics, and/or changes in characteristics measured or detected by one or more of sensors 402 as the mobile computing device 400 is in motion, and may define an estimated path of motion of the mobile computing device 400 based on measured or detected characteristics and/or changes in characteristics.

In one example, a combination of three-dimensional linear acceleration data of the mobile computing device 400 from accelerometer 403 and rotational data of the mobile computing device 400 from gyroscope 404 can be used by path estimation module 414 to estimate a three-dimensional path of motion of the mobile computing device 400.

In one example, image data captured by camera 410 can be used by path estimation module 414 to estimate a three-dimensional path of motion of the mobile computing device 400 based on differences between successive images captured by camera 410. For each image frame, path estimation module 414 can detect points of interest and compute region descriptors around these points of interest. Furthermore, path estimation module 414 can calculate the motion of the points of interest based on the differences in position of the points of interest from one frame to another. Finally, path estimation module 414 can estimate the path of motion of the mobile computing device 400 based on the motion of the points of interest.

Alternatively, path estimation module 414 can track every pixel in an image frame captured by camera 410, and path estimation module 414 can use the motion of the pixels from one frame to another to estimate the path of motion of the mobile computing device 400.

In one example, only rotational data of the mobile computing device 400 captured by gyroscope 404 may be used by path estimation module 414 to estimate a two-dimensional path of motion of the mobile computing device 400. Such use of only rotation data captured by and sent from gyroscope 404 may be ideal in a handwriting recognition process to recognize the two-dimensional path of motion of a corner of the mobile computing device 400 against a two-dimensional surface as one or textual more characters and/or words.

In this example, it can be assumed that a portion of a physical enclosure of the mobile computing device 400, such as a corner of the physical enclosure of the mobile computing device 400, moves against a two-dimensional surface, as was previously shown in FIG. 3, and that only rotational movements of the mobile computing device 400 may occur as the mobile computing device 400 moves against the two-dimensional surface. The point where the corner of the mobile computing device 400 touches the two-dimensional surface can be estimated by portion estimation module 418, and the rotational data collected by gyroscope 404 as the mobile computing device 400 moves against a two-dimensional surface can be used by path estimation module 414 to calculate a two-dimensional path of motion of the corner of the mobile computing device 400.

Alternatively, acceleration data of the mobile computing device 400 captured by the accelerometer 403 and/or linear acceleration sensor 406 indicating linear acceleration of the mobile computing device 400 may be used in conjunction with rotational data captured by gyroscope 404, orientation sensor 405, and/or rotational vector sensor 408 to improve the accuracy of path estimation module 414 in estimating the path of motion of the mobile computing device 400.

In some situations, the mobile computing device 400 may determine that the path of motion is one or more characters. For example, the mobile computing device 400 may be in a text input mode when the path of motion of the mobile computing device 400 is captured. In these situations, the path estimation module 414 may be able to pre-process the estimated path of motion with certain corrections that may be useful for increasing the recognition rate of the handwriting module 416, such as slant correction and alignment with a baseline. Such pre-processing by the path estimation module 414 may cause the path estimation module 414 to define an estimated path of motion that does not exactly correspond to the path of motion of the mobile computing device 400 as measured by one or more of sensors 402.

In one example, path estimation module 414 can limit the length of a stroke in the estimated path of motion to a threshold length. For example, the path estimation module 414 might set the threshold length to two centimeters. In this case, for any stroke within the path of motion of the mobile computing device 400 that exceeds the two-centimeter threshold, the corresponding stroke within the estimated path of motion will be limited to two centimeters in length.

In one example, when a user is using a portion, such as a corner of a physical enclosure of the mobile computing device 400 to "write" against a two-dimensional surface, path estimation module 414 may be able to detect superfluous strokes within the path of motion of the corner of the mobile computing device 400, such as when the user is lifting the mobile computing device 400 to dot the letter "i" or to cross the letter "t", and to remove the superfluous paths or strokes caused by the user lifting the mobile computing device 400 from the estimated path of motion. Alternatively, path estimation module 414 may also treat detections of such lifting of the mobile computing device 400 off of the two-dimensional surface as the user indicating a space between characters and/or words. In this case, path estimation module 414 may insert a signal in the estimated path of motion indicating that a space should be inserted.

Such superfluous paths or strokes may be detected using microphone 409. For example, microphone 409 may be able to capture and recognize the sound of the mobile computing device 409 contacting the two-dimensional surface after the mobile computing device 400 was lifted off of the two-dimensional surface, and the captured sound may be recognized as indicating superfluous paths or strokes. The superfluous paths or strokes may be removed from the estimated path of motion.

Alternatively, superfluous paths or strokes may be detected using accelerometer 403 and/or linear acceleration sensor 406. For example, it can be assumed that for a mobile computing device 400 having a portion of its physical enclosure, such as a corner of its physical enclosure, that is used to "write" on a two-dimensional surface, the mobile computing device 400 may mostly be moving in only two dimensions across the two-dimensional surface. However, if accelerometer 403 and/or linear acceleration sensor 406 detects that the mobile computing device 400 is moving in a third dimension, such as when the user is lifting the mobile computing device 400 off of the two-dimensional surface, such movement in the third direction can be recognized as indicating superfluous paths or strokes.

Path estimation module 414 may also be able to detect the end of a first series of strokes within the path of motion of the mobile computing device 400 and the start of a second series of strokes within the path of motion of the mobile computing device 400 following the first series of strokes. For example, such a break may be detected by path estimation module 414 when the user holds the mobile computing device 400 stationary to indicate that the user has finished writing a first set of strokes making up a first character or word and is ready to start a second series of strokes making up a second character or word.

In one example, accelerometer 403 may be able to detect that the mobile computing device 400 is not moving. Upon such detection, path estimation module 414 may insert an indication in the estimated path of motion of a break or a space between the first series of strokes and the second series of strokes. Alternatively, path estimation module 414 may insert an indication in the estimated path of motion indicating that the first series of strokes and the second series of strokes should be recognized as two separate characters or words.

Path estimation module 414 may also be able to process an estimated path of motion to de-slant the estimated path of motion. For example, if it is determined that the path of motion of the mobile computing device 400 includes more than a threshold amount of oblique strokes, the estimated path of motion corresponding to the path of motion of the mobile computing device 400 may be altered so that the oblique strokes within the path of motion of the mobile computing device 400 may be de-slanted to become more upright in the estimated path of motion. This de-slanting process may be useful in many situations where the estimated path of motion generated by the path estimation module 414 is to be defined as characters, including the situation described above where only rotational movements of the mobile computing device 400 captured by gyroscope 404 is used by path estimation module 414 to estimate a two-dimensional path of motion of the mobile computing device 400.

Handwriting module 416 may identify one or more characters based at least in part on the estimated path of motion generated by path estimation module 414. The handwriting module 414 may, for example, be conventional handwriting recognition logic for recognizing two-dimensional paths and/or strokes as one or more characters.

Portion estimation module 418 may estimate the portion of the physical enclosure of the mobile computing device 400 that is most likely to be in contact with a two-dimensional plane or surface based on data from one or more of sensors 402. Estimating the portion of the physical enclosure may be useful for when a user contacts a portion, such as a corner, of the physical enclosure of the mobile computing device 400 with a surface much like a pen point contacting a piece of paper. Based on the estimation of portion estimation module 418, path estimation module 414 can estimate the two-dimensional path of motion of the portion, such as the corner, of the physical enclosure of the mobile computing device 400 estimated by the portion estimation module 418.

In one example, rotational data from gyroscope 404 may be used by portion estimation module 418 to estimate the portion of the physical enclosure of the mobile computing device 400 based on the pitch of the mobile computing phone 400 as detected using gyroscope 404. Alternatively, other sensors such as accelerometer 403 may be used to estimate the portion of the physical enclosure of the mobile computing device 400.

Alternatively, instead of estimating the portion of the physical enclosure of the mobile computing device 400, the portion of the physical enclosure may instead be pre-selected or otherwise fixed.

Any applications implemented within or executed by the mobile computing device 400 (e.g., application 420) may be implemented or contained within, operable by, executed by, and/or be operatively coupled to processor(s) 412, memory 426, storage devices 428, network interface 422, and/or user interface 424.

Application 420 may be stored in memory 426 or storage devices 428. Application 420 may receive one or more characters or words defined by handwriting recognition module 416 for input into application 420. For example, application 420 may receive the one or more characters so that a graphical representation of the one or more characters can be inserted into a text input field within application 420, and the graphical representation of the one or more characters and the text input field may be outputted on user interface 424, such as a display, of the mobile computing device 400. Alternatively, the one or more characters might trigger a command or cause an action to be taken in application 420.

Application 420 also can receive the estimated path of motion. For example, application 420 may receive and interpret the estimated path of motion as a gesture which, when performed, triggers a command or cause an action to be taken in application 420. Examples of commands or actions that may be triggered in application 420 as a result of receiving the path of motion may include: drawing a representation of the path of motion on a canvas within application 420, controlling a cursor, skipping to the next song or movie of a playlist, or fast forwarding or rewinding a song or movie.

Application 420 may also forward the path of motion estimated by path estimation module 414 via network interface 422 to an external device or system. The estimated path of motion may be processed by the external device or system, or may be used to control the external device or system.

Network interface 422 may be used to communicate with external devices via one or more networks. Network interface 422 may also allow the mobile computing device 400 to connect to a network for which network interface 422 is configured using the network configuration information associated with the network. Methods of communications supported by network interface 422 may include any known methods of wired and/or wireless communications.

User interface 424 may include, for example, a monitor or other display device for presenting visual information to a user of the mobile computing device 400. User interface 424 may further include one or more input devices to enable a user to input data, such as a manual keyboard, mouse, touchpad, trackpad, etc. In some examples, user interface 424 may comprise a touchscreen, which may be used both to receive and process user input and also to display output information and application-specific options. In some examples, user interface 424 may comprise one or more physical buttons. User interface 424 may further include printers or other devices to output information. In various instances in the description contained herein, references made to user interface 424 may refer to portions of user interface 424 (e.g., keyboard, touch screen, mouse device) that provide user input functionality.

Memory 426 may be configured to store information within mobile computing device 400 during operation. Memory 426 may, in some examples, be described as a computer-readable storage medium or non-transitory processor-readable medium. In some examples, memory 426 is a temporary memory, meaning that a primary purpose of memory 426 is not long-term storage. Memory 426 may also be described as a volatile memory, meaning that memory 426 does not maintain stored contents when the mobile computing device 400 is turned off. Examples of volatile memories include random access memories (RAM), dynamic random access memories (DRAM), static random access memories (SRAM), and other forms of volatile memories known in the art. In some examples, memory 426 may be used to store program instructions for execution by processor(s) 412. Memory 426 may be used by software or applications running on the mobile computing device 400 (e.g., application 420) to temporarily store information during program execution.

Storage devices 428 may also include one or more computer-readable storage media. Storage devices 428 may be configured to store larger amounts of information than memory 426. Storage devices 428 may further be configured for long-term storage of information. In some examples, storage devices 428 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Figure 5:
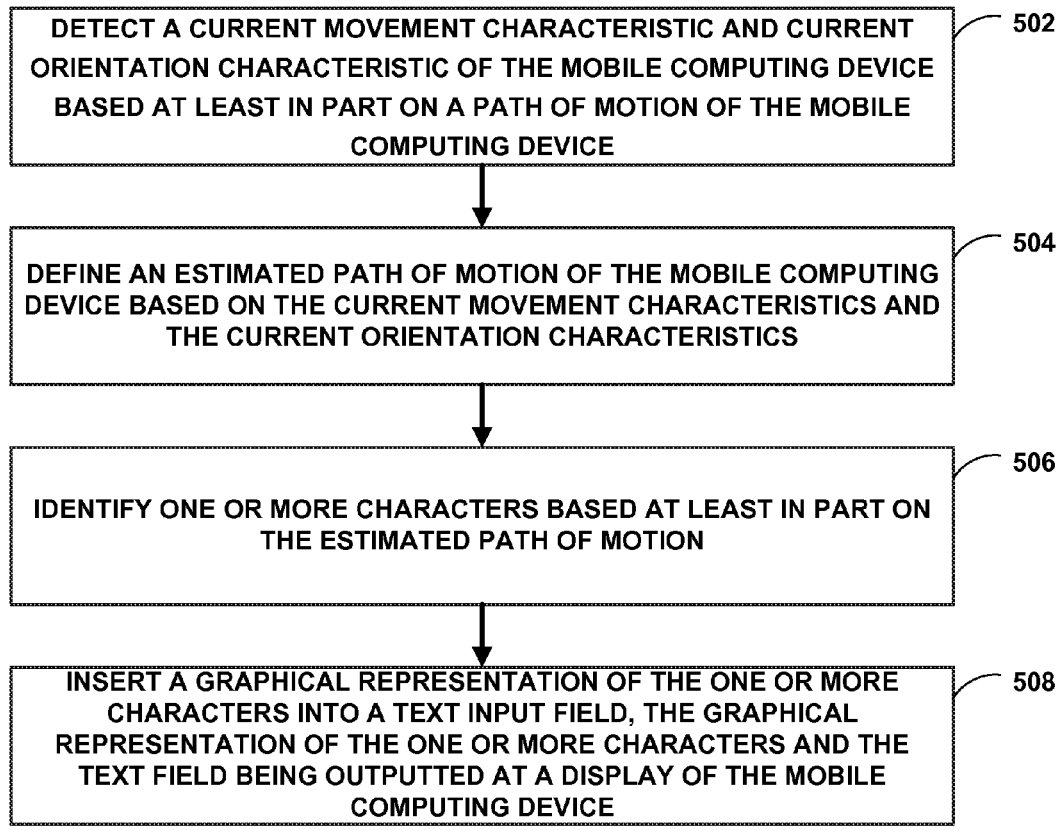
FIG. 5 is a flowchart illustrating an example method for estimating a path of motion of a mobile computing device.

FIG. 5 is a flowchart illustrating an example operation of a process for estimating a path of motion of a mobile computing device 400. In some examples, the method illustrated in FIG. 5 may be performed or implemented by the mobile computing device 400 described above with regards to FIG. 4.

One or more of sensors 402 may detect a current movement characteristic of the mobile computing device 400 and a current orientation characteristic of the mobile computing device 400, the current movement characteristic and the current orientation characteristic being based at least in part on a path of motion of the mobile computing device 400 (502). In some examples, the current movement characteristic may include acceleration characteristics and rotational characteristics. In some examples, acceleration characteristics may include acceleration vectors in three dimensions. In some examples, rotational characteristics may include rotational vectors in three dimensions. In some examples, the current orientation characteristic may include pitch, row, and azimuth values.

Path estimation module 414 running on one or more of processor(s) 412 or, alternatively, running on an external system (e.g., the cloud), may define an estimated path of motion of the mobile computing device 400 based on the current movement characteristics and the current orientation characteristics (504). In one example, path estimation module 414 may take as inputs the current movement characteristics and the current orientation characteristics to define a three-dimensional path of motion of the mobile computing device 400. Path estimation module 414 may further map the defined three-dimensional path of motion into a two-dimensional plane, such as via three-dimensional projection. Path estimation module 414 may also perform any pre-processing for improving the recognition rate of handwriting recognition module 416, such as de-slanting strokes, removing extraneous strokes, or providing indications of breaks between series of strokes, as discussed above.

Handwriting recognition module 416 running on one or more of processor(s) 412 or, alternatively, running on an external system, may identify one or more characters based at least in part on the estimated path of motion of the mobile computing device 400 (506).

Graphical representations of the one or more characters may be inserted into a text input field. The graphical representations of the one or more characters and the text input field may also be outputted at a display of the mobile computing device (508). Alternatively, one or more functionality and/or actions within application 420 may be triggered based on the one or more characters. Such actions and/or processes may include outputting one or more graphical representations of the one or more characters onto user interface 424, such as by causing the one or more characters to be displayed on a display, or sending the one or more characters by network interface 422 of the mobile computing device 400 to an external computing device.

Figure 6:
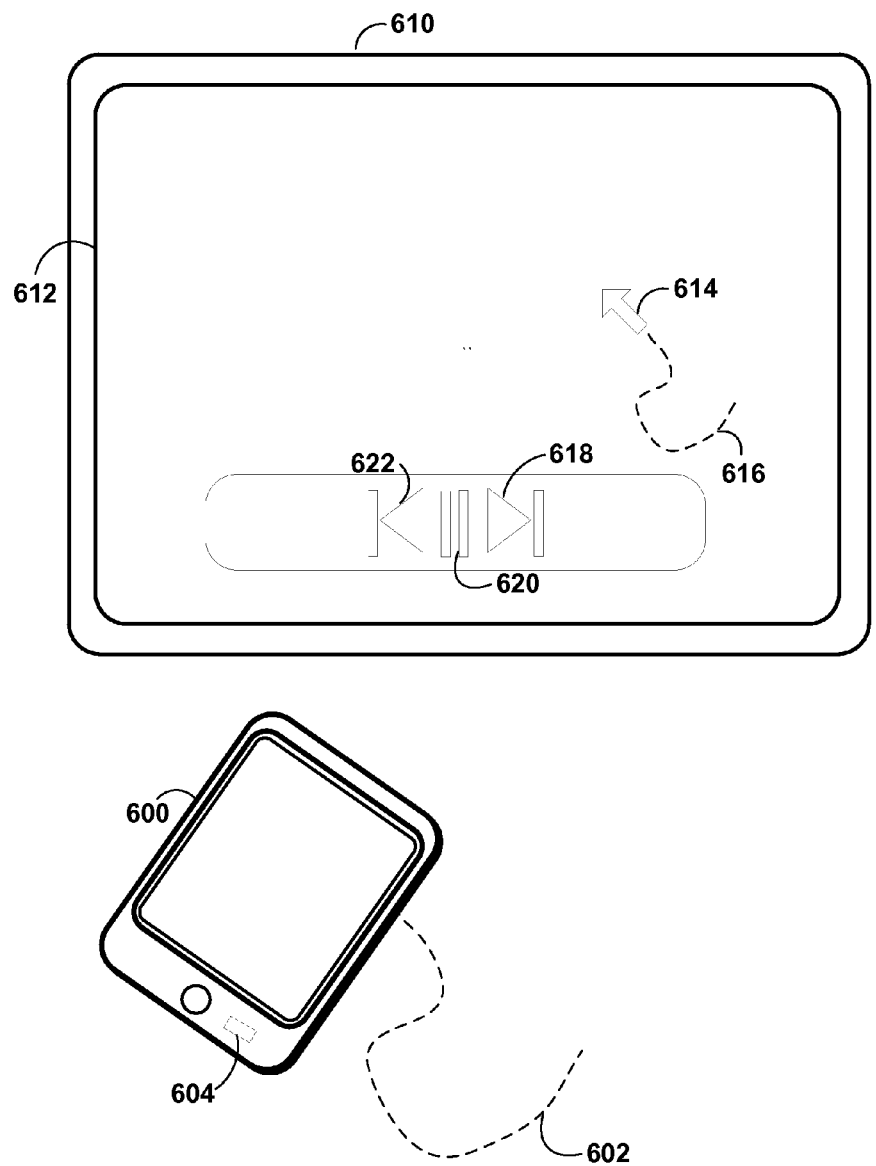
FIG. 6 is a conceptual diagram illustrating an example use of motion of a mobile computing device to control an external computing device.

FIG. 6 is a conceptual diagram illustrating an example use of motion of a mobile computing device to control an external computing device. As shown in FIG. 6, a mobile computing device 600 may include sensors 604. The mobile computing device 600 may move in one, two, or three dimensional spaces to form a path of motion 602. Sensors 604 of the mobile computing device 600 may be used to detect changes in physical characteristics of the mobile computing device 600 based at least in part on the path of motion 602 of the mobile computing device 600, so that the path of motion 602 can be estimated by the mobile computing device 600.

Signals corresponding to the path of motion 602 of the mobile computing device 600 may be sent from the mobile computing device 600 to an external computing device 610. The external computing device 610 may include a user interface 612. The signals corresponding to the path of motion 602 sent by the mobile computing device 600 may cause a cursor 614 to move about the user interface 612 of the external computing device 610 in a cursor path of motion 616 that corresponds with the path of motion 602 of the mobile computing device 600. For example, the cursor path of motion 616 may be a two-dimensional representation of the path of motion 602 of the mobile computing device 600.

Alternatively, the mobile computing device 600 may simulate a laser pointer. The mobile computing device 600 may be pointed towards the user interface 612 and a gyroscope of the sensors 604 of the mobile computing device 600 can determine the point on the user interface 612 where an imaginary extended axis of the device may intersect with the user interface 612. The cursor 614 may appear on the user interface 612 at the determined point.

Signals corresponding to the path of motion 602 of the mobile computing device 600 may also cause one or more functionality to be selected in the external computing device 610. For example, fast forward functionality 618, pause functionality 620, and rewind functionality 622 of a media player application running on the external computing device may each be selected depending on the path of motion 602 of the mobile computing device 600.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium or non-transitory processor-readable medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, a computer-readable storage medium may comprise a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the disclosure have been described. These and other embodiments are within the scope of the following claims.

The invention claimed is:

1. A method, comprising:
   detecting, by one or more sensors of a mobile computing device, a current movement characteristic of the mobile computing device and a current orientation characteristic of the mobile computing device, the current movement characteristic and the current orientation characteristic being based at least in part on a path of motion of the mobile computing device;
   defining, based on the current movement characteristic and the current orientation characteristic, an estimated path of motion of the mobile computing device;
   identifying one or more characters based at least in part on the estimated path of motion; and
   inserting a graphical representation of the one or more characters into a text input field, the graphical representation of the one or more characters and the text input field being outputted at a display of the mobile computing device.

2. The method of claim 1, wherein defining the estimated path of motion comprises:
   detecting one or more superfluous strokes from a plurality of strokes making up the path of motion of the mobile computing device; and
   removing the one or more superfluous strokes from the estimated path of motion.

3. The method of claim 2, wherein detecting the one or more superfluous strokes is based on sound detected by a microphone in the one or more sensors.

4. The method of claim 1, wherein defining the estimated path of motion comprises:
   detecting an end of a first series of strokes within the path of motion of the mobile computing device and a start of a second series of strokes within the path of motion of the mobile computing device following the first series of strokes, the first series of strokes comprising a first character and a second series of strokes comprising a second character; and
   inserting, in the estimated path of motion, an indication of a break between the first series of strokes and the second series of strokes.

5. The method of claim 4, wherein detecting the end of the first series of strokes is based on at least one of the current movement characteristic and the current orientation characteristic indicating that the mobile computing device is not moving.

6. The method of claim 1, further comprising:
   estimating a portion of a physical enclosure of the mobile computing device that is in contact with a surface, wherein the estimated path of motion is an estimated path of motion of the portion of the physical enclosure of the mobile computing device.

7. The method of claim 6, wherein the estimated path of motion is defined based only on rotational characteristics corresponding to rotational movements of the mobile computing device captured by a gyroscope included in the one or more sensors.

8. The method of claim 7, wherein defining the estimated path of motion comprises:
   de-slanting one or more oblique strokes of the path of motion of the mobile computing device.

9. The method of claim 1, wherein defining the estimated path of motion comprises:

limiting the length of one or more strokes within the estimated path of motion to a threshold length.

10. The method of claim 1, wherein there is a one-to-one correspondence between the path of motion of the mobile computing device and the estimated path of motion.

11. The method of claim 1, wherein the estimated path of motion comprises a two-dimensional representation of the path of motion of the mobile device.

12. The method of claim 1, wherein:
the one or more sensors include a camera that captures image data; and
the estimated path of motion is defined based on at least the image data.

13. The method of claim 12, wherein the estimated path of motion is defined based on differences between successive images captured by the camera.

14. The method of claim 1, further comprising:
sending, by a network interface of the mobile computing device, the one or more characters to an external computing device.

15. The method of claim 14, further comprising:
sending the one or more characters to a remote application running on the external computing device.

16. The method of claim 15, further comprising:
triggering a functionality of the remote application based on the one or more characters.

17. The method of claim 15, further comprising:
inserting the graphical representation the one or more characters into a text input field of the remote application.

18. The method of claim 1, further comprising:
outputting the graphical representation of the one or more characters to a user interface of the mobile computing device.

19. A non-transitory processor-readable medium comprising code representing instructions configured to cause a processor to:
detect, by one or more sensors of a mobile computing device, one or more changes in at least one of movement and orientation of the mobile computing device, the one or more changes being based at least in part on movement of the mobile computing device in three-dimensional space;
define an estimated path of motion based on the one or more changes, the estimated path of motion including an indication of a break between a first series of strokes and a second series of strokes; and
identify one or more characters based at least in part on the estimated path of motion.

20. A mobile computing device comprising:
one or more processors;
a portion estimation module being executed on the one or more processors and configured to estimate which portion of a physical enclosure of the mobile computing device is in contact with a two-dimensional surface;
one or more sensors configured to define one or more measurements of one or more forces acting upon the mobile computing device in response to movement of the mobile computing device along a path of motion; and
a path estimation module being executed on the one or more processors and configured to define an estimated path of motion for the portion of the physical enclosure of the mobile computing device based on the one or more measurements.

* * * * *